Patented Mar. 25, 1930

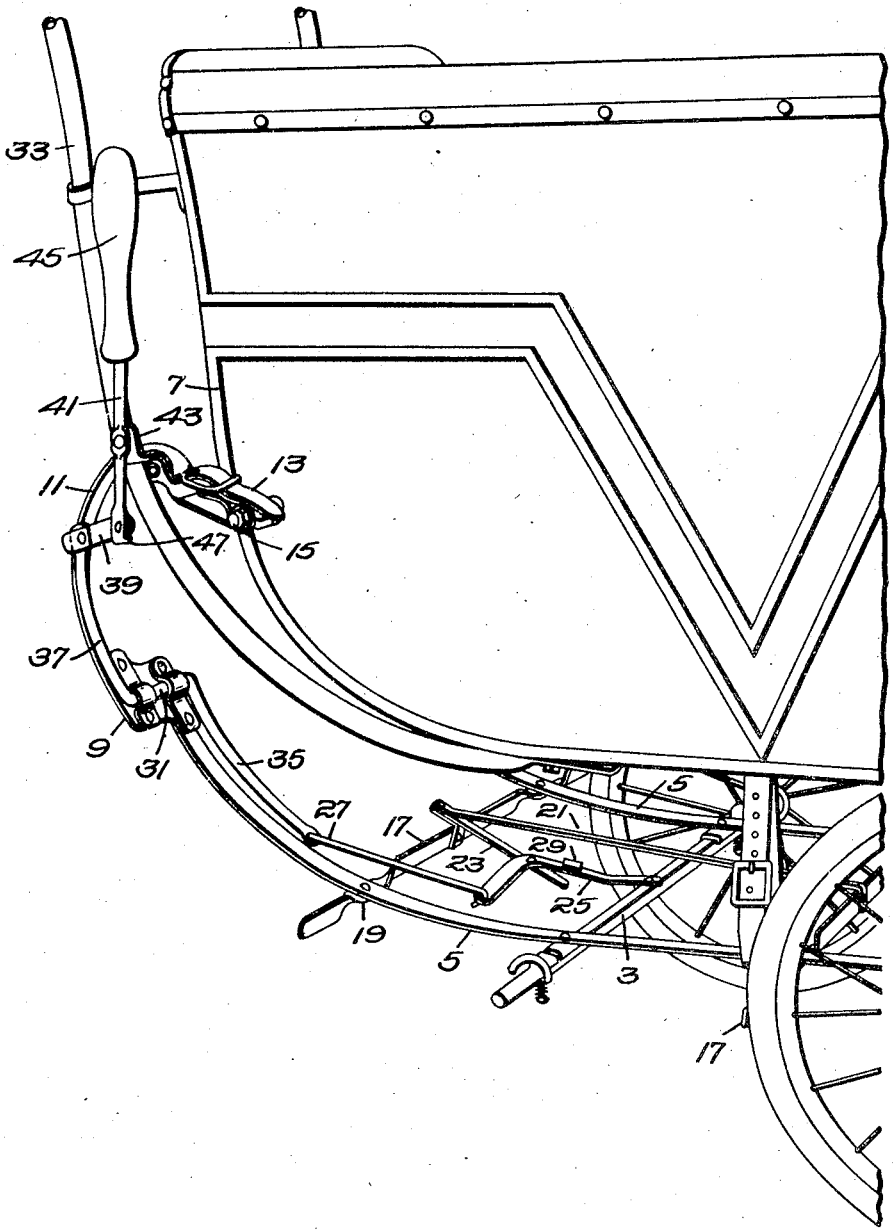

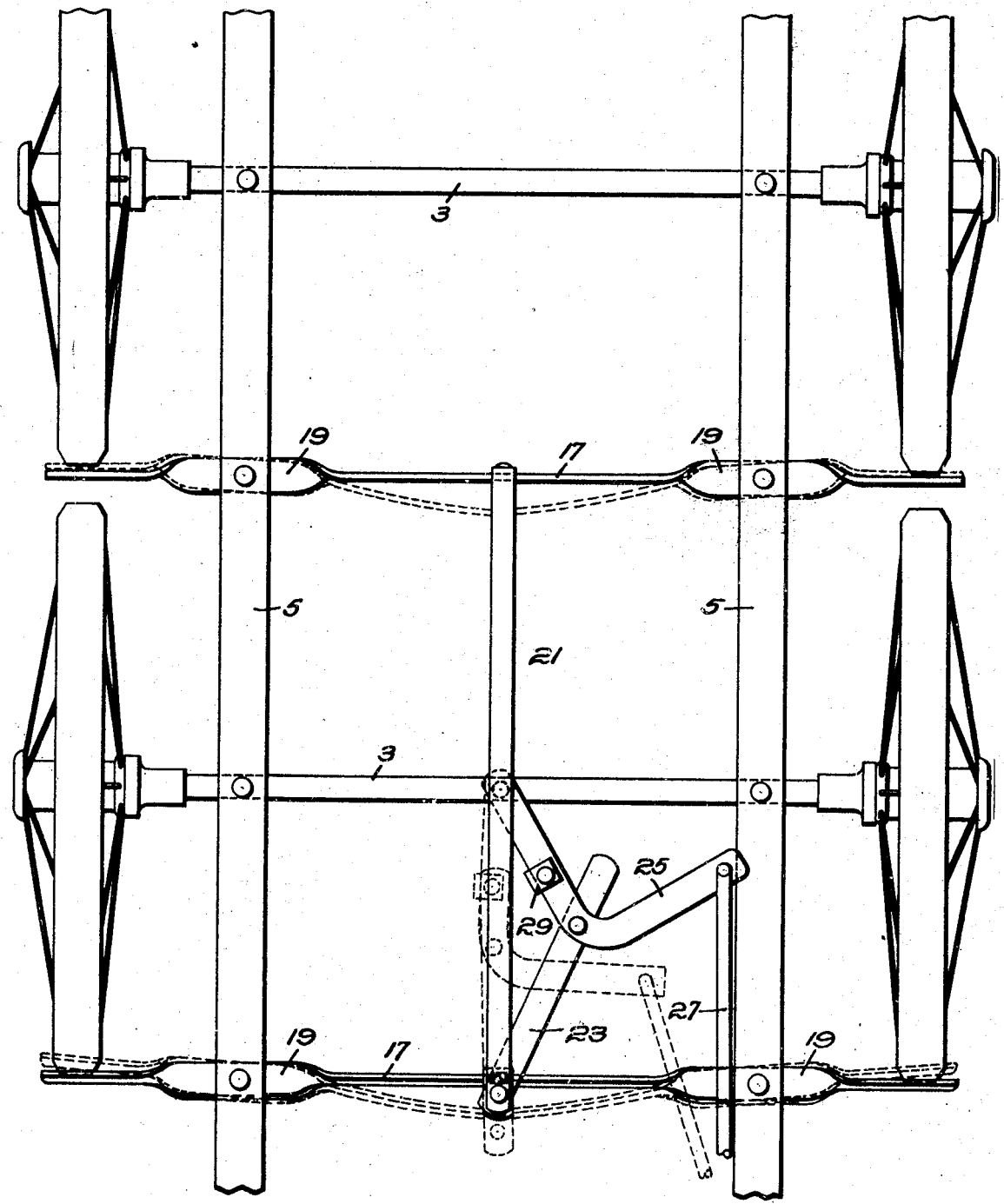

1,752,269

UNITED STATES PATENT OFFICE

HAROLD F. SHAW, OF LEOMINSTER, MASSACHUSETTS, ASSIGNOR TO F. A. WHITNEY CARRIAGE COMPANY, OF LEOMINSTER, MASSACHUSETTS, A CORPORATION OF MASSACHUSETTS

BRAKE FOR BABY CARRIAGES

Application filed April 17, 1929. Serial No. 355,860.

This invention relates to baby carriages and more particularly to the braking mechanism thereof, and the object is to provide a carriage having a conveniently and easily hand-controlled brake.

My invention will be well understood by reference to the following description of an illustrative embodiment thereof shown by way of example in the accompanying drawings, wherein:

Fig. 1 is a fragmentary perspective view of a baby carriage embodying my invention with one of the wheels removed; and Fig. 2 is a broken plan view of the underframe and running gear of the carriage.

Referring to Fig. 2 of the drawings, the carriage herein shown comprises axles 3 connected by longitudinal perches 5 adapted to underlie the body 7 (Fig. 1). These perches preferably take the form of springs having upturned ends, as shown in Fig. 1. By their ends are carried laterally projecting supports 9 to which are attached bowed springs 11 from which the body 7 is suspended as by means of straps 13 attached to studs 15 projecting from the sides of the body. As will be seen from the following description, I utilize the upwardly extending members provided by perches 5 and springs 11 in the organization and operation of the braking mechanism.

Referring to Fig. 2, the brake herein shown comprises a brake beam 17 in the form of a flat strip of spring metal disposed vertically on edge but twisted to provide horizontal portions 19 pivotally attached to the perches 5. The ends of the strip are presented adjacent the wheels and provide brake shoes. The strip may be sprung to the dotted line position shown to apply the brake and it resiliently tends to assume the off position. The vehicle herein shown brakes on all four wheels and a brake beam 17 is provided for each pair of wheels, the two being connected by a bar 21 to operate as a unit.

To spring the brake beams the middle portions thereof may be pressed to the left, viewing Fig. 2, by means of a strut 23 pivotally attached to one of the beams 17 to swing in a horizontal plane and adapted to be thrust toward the left by means of a bell crank lever 25 pivoted to a suitable fixed support, such as axle 3, and to the strut 23. One arm of the bell crank and the strut form a toggle swinging in a horizontal plane and the other arm of the bell crank an operating lever for straightening and breaking the toggle and adapted to be moved by a connecting rod 27. To prevent the toggle from being thrown too far over dead center one arm of the strut 23 may be extended past the pivotal point and cooperate with a stop lug 29 secured to the other arm of the toggle. As is clear from Fig. 2, when the connecting rod is drawn to the left, the toggle is straightened, springing the brake beam 17 and throwing the ends thereof against the wheels. The toggle is thrown over dead center with the extension of the strut against stop 29 and is held in that position by the resiliency of the brake beam. Movement of connecting rod 27 toward the right in Figure 1 breaks the toggle and permits the brake beams resiliently to return to the off position shown in full lines.

For reciprocating connecting rod 27 I may provide a rock shaft 31 journalled in suitable bearings on one of the supporting plates 9 conveniently adjacent to the pusher bar 33 of the carriage, this rock shaft being provided with oppositely extended crank arms 35 and 37 which roughly parallel the adjacent parts of perch 5 and spring 11 and which are therefore not unduly conspicuous. In the drawing the arms 35 and 37 are shown curved to conform to the curvature of the adjacent parts. Arm 35 may be connected to connecting rod 27 and arm 37 joined by means of a link 39 to a lever handle 41 pivoted to a clip 43 secured adjacent the upper end of spring 11 and providing a hand grip 45 conveniently disposed near the upper portion of the carriage body 7. The end of the lever 41 may be turned over to provide a stop 47 engaging the link and, in the position of the parts shown in Fig. 1, supporting the lever in substantially upright position.

It will be understood that if lever 41 is swung in a vertical plane to the left from the position shown in Fig. 1, connecting rod 27 will be moved toward the left and the brake mechanism thrown to the dotted line position of Fig. 2. Rocking the lever back to the right in Fig. 1 will return the parts to the full line position and throw off the brake.

In the construction herein shown as an example of the invention the supports 9 not only hold the springs 11 out beyond the sides of the carriage body 7, permitting the body to be suspended between them, but they provide a suitable wide bearing for the rocker 31 while the crank arms 35 and 37 extending therefrom are not unduly conspicuous since they lie beside the adjacent parts of the perch 5 and spring 11. The spring brake beams 17, especially when two of them are operated simultaneously as in the case of a four-wheel brake, offer considerable resistance. By mounting the link-work which actuates the toggle mechanism on a support provided by a spring, yielding of the spring is permitted as the handle is operated, permitting power to be stored up and force gradually exerted to overcome the resistance of the resilient brake beams. Also, on release of these beams when the brake is thrown off, the sudden snap action is not violently transmitted to the hand as it may be absorbed more or less by the spring 11 and/or the spring herein provided by perch 5.

I am aware that the invention may be embodied in other specific forms without departing from the spirit or essential attributes thereof, and I therefore desire the present embodiment to be considered in all respects as illustrated and not restrictive; reference being had to the appended claims rather than to the foregoing description to indicate the scope of the invention.

Claims:

1. In a baby carriage an underframe comprising longitudinal perches to underlie the body, laterally extending supports at the ends thereof, bowed springs carried by said supports and suspending the body between them, a resiliently pressed brake on the underframe, a mechanism for springing the same, a rocker pivoted to one of said supports connected to said mechanism, and a hand lever pivoted adjacent the end of the spring rising from the support and linked to the rocker.

2. In a baby carriage an underframe, springs rising therefrom having incurved ends from which the body is suspended, a spring bar pivoted to the frame and having its ends presented to the wheels to provide brake shoes, a toggle mechanism acting on the bar and adapted to be thrown over dead center to spring the same, a connecting rod extending from the toggle, a lever handle near the upper portion of the carriage, and means to communicate motion from said handle to said rod comprising an element having a supporting bearing on one of the springs aforesaid.

3. In a baby carriage an underframe, springs rising therefrom, a body hung from said springs, brake shoes resiliently pressed to one position, and means for shifting said shoes comprising linkwork having an operating handle and provided with a fulcrum bearing on a spring.

4. In a baby carriage a frame comprising axles and longitudinal members supported therebetween and extending upwardly at their ends, a body suspended therefrom, brake shoes adjacent wheels, a mechanism operating in a horizontal plane adjacent the underframe for applying and releasing the brake shoes, a handle near the upper part of the vehicle, and means to communicate motion from said handle to said mechanism comprising a rock shaft pivoted on the upwardly extended part of one of said members and having oppositely disposed arms lying adjacent the same.

5. In a baby carriage a frame including axles and perches having upwardly curved end portions, laterally projecting supports carried at the ends of the perches, bowed springs mounted on the supports to suspend the body, a bearing on one support receiving a transverse rock shaft, arms at the ends of said shaft extending up and down respectively, a handle near the upper portion of the carriage connected to the first of said arms to swing the same, and brake-operating mechanism adjacent the axles connected to the second of said arms.

6. In a baby carriage an underframe comprising axles and longitudinal perches, a spring bar pivoted on the perches and having its ends presented to wheels to provide brake shoes, a strut for springing the bar pivoted to swing in a horizontal plane, a bell crank pivoted on vertical pivots to the axle and to said strut, said strut extending past its point of connection to said bell crank to provide a stop for the latter, a connecting rod extending from the bell crank and operating mechanism connected to said rod swinging in a substantially vertical plane and terminating adjacent the upper portion of said carriage in a lever handle.

In testimony whereof, I have signed my name to this specification.

HAROLD F. SHAW.